United States Patent Office 2,919,760
Patented Jan. 5, 1960

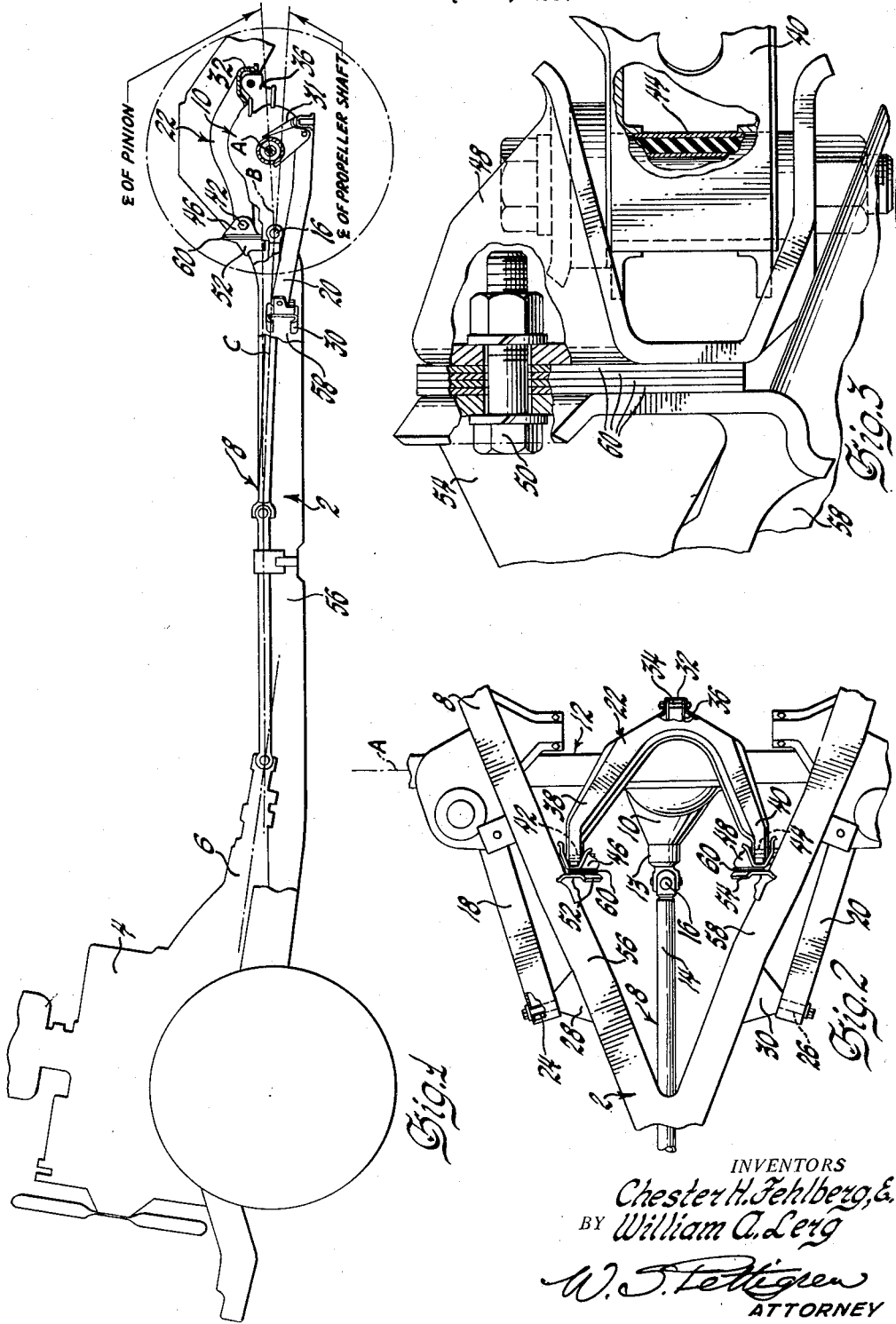

2,919,760

ADJUSTABLE SUSPENSION FOR VEHICLE DRIVING WHEELS

Chester H. Fehlberg and William A. Lerg, Detroit, Mich., assignors to General Motors Corporation, Detroit, Mich., a corporation of Delaware Application September 9, 1957, Serial No. 682,833

4 Claims. (Cl. 180—73)

This invention relates to vehicle suspension and particularly to suspension for vehicle driving wheels carried by a rigid axle, the movements of which relative to the associated vehicle chassis are controlled by a plurality of pivoted links.

An object of the present invention is to provide an improved suspension for vehicle driving wheels.

Another object is to provide a linkage guided rigid axle assembly including a differential having a driving pinion universally connected with the vehicle propeller shaft, the linkage being constructed and arranged so as to permit angular adjustment of the rigid axle structure about its horizontal transverse axis to establish a predetermined angular relation between the pinion axis and the propeller shaft axis.

A further object is to provide a structure of the stated character including adjustment means affording a substantial range of adjustment.

A still further object is to provide adjustment means for the stated structure which effectively eliminate any possibility of subsequent departure from the initial predetermined position of adjustment.

Still another object is to provide a structure of the stated character including adjusting means of simple construction and low cost.

These and other objects, advantages and features of the invention will become more fully apparent as reference is had to the accompanying specification and drawings wherein:

Fig. 1 is a schematic side elevational view of a vehicle chassis incorporating a suspension linkage of the type referred to and including adjustment means according to the present invention;

Fig. 2 is a fragmentary top plan view of the rear portion of the vehicle chassis shown in Fig. 1, illustrating the disposition and relationship of the suspension linkage, associated rigid axle and propeller shaft; and Fig. 3 is an enlarged fragmentary top plan view, partly in section and with parts broken away, illustrating details of construction of the adjustment means for the linkage.

Referring now to the drawings and particularly Figs. 1 and 2, there is illustrated a vehicle chassis in which the reference numeral 2 designates generally a cruciform frame upon which is carried the usual forwardly mounted engine 4 and transmission 6. Extending rearwardly from transmission 6 is a propeller shaft assembly 8 which transmits engine torque to the differential mechanism 10 mounted centrally between the opposite ends of a rigid rear axle housing 12. Differential 10 includes a drive pinion assembly, the forward end 13 of which is pivotally connected to the rearward end 14 of propeller shaft assembly 8 by means of a universal joint 16. Axle housing 12 is oriented about its transverse axis "A" relative to the chassis frame 2 by means of a pair of laterally spaced rearwardly diverging trailing links 18 and 20 and an upper wishbone type trailing link 22. As seen best in Fig. 2, the forward ends of lower links 18 and 20 are pivotally connected to frame 2 by rubber bushed pin joints 24 and 26 which engage outrigger brackets 28 and 30, while the rearward ends of the link extend beneath axle 12 and are pivotally connected by pin joints engaging depending brackets 31 rigidly connected to the axle 12. Wishbone link 22, in turn, has its rearward end 32 connected by a rubber bushed pin joint 34 to a bracket 36 rigidly secured to the differential housing substantially above and rearwardly of the transverse axis "A." The forward diverging legs 38 and 40 of wishbone frame 22, in turn, are pivotally connected by rubber bushed pin joints 42 and 44 to brackets 46 and 48, respectively. Brackets 46 and 48, in turn, are clamped into abutting engagement by bolts 50 to cooperating brackets 52 and 54 welded inboard of the legs 56 and 58 of frame 2. It will be evident from Figs. 1 and 2 that the arrangement described affords complete freedom of parallel vertical oscillation of axle structure 12 relative to chassis frame 2 while limiting angular movement of the axle relative to the frame to a vertical transverse plane. The linkage thus affords all of the freedom of movement of conventional rear wheel suspension, while providing maximum lateral stability between the frame and the driving axle.

In addition to the advantageous operational characteristics described above, suspension linkage of the type described positively controls the angular inclination of the axle housing 12 about its own transverse axis throughout its entire range of vertical deflection. That is, any predetermined angle perpendicular to the axis "A" of the axle, for example the differential pinion axis "B," is compelled to progressively change its angular inclination as the axis structure oscillates upwardly and downwardly. In the illustrated embodiment, it will be evident that rising movement of the axle relative to the frame occasions progressive counterclockwise angular movement of the pinion axis "B" which results in downward inclination thereof to a greater degree than exists at the design height illustrated.

In practice it has been determined that optimum drive line efficiency and minimum load vibration and noise may be obtained by initially establishing and maintaining a calculated angular relationship between the axis "B" of the differential pinion and the axis "C" of the propeller shaft 8. In order to obtain this predetermined angular relationship and assure maintenance thereof in accordance with the present invention, brackets 46 and 48 and cooperating brackets 52 and 54 have interposed therebetween one or more shims 60. Shims 60 alter the longitudinal position of the axis of pivots 42 and 44 of wishbone 22 which results in varying the initial angular inclination of the pinion axis "B." In practice the axle housing 12 is located in the desired angular position by employing a fixture to restrain the axle assembly in a predetermined angular and elevational relation with the frame while the brackets 46 and 48 are loosely connected to brackets 52 and 54 by bolts 50 and then introducing the required number of shims 46 between the adjacent faces of the respective brackets to fill whatever gap may exist. Bolts 50 are then tightened sufficiently to clamp the brackets and shims into effective rigid relation.

It will be appreciated that the tolerances required in high production fabrication of the relatively heavy mechanical parts of the suspension linkage, occasionally results in lack of lateral symmetry in final assembly of the linkage of the type illustrated. However, the present invention also effectively overcomes such occasional variation, since its correction merely requires the addition or removal of the correct number of shims to place the linkage in lateral symmetry. As a practical matter, such deviation is automatically corrected when shimming to obtain the desired pinion axle, since the position of the parts dictated by the jig will require an unequal number of shims whenever lateral symmetry exists.

While the form of the apparatus herein described constitutes a preferred embodiment, numerous changes and modifications may be made therein without departing from the scope of the invention. It is, therefore, to be understood that it is not intended to limit the invention to the embodiment shown, but only by the scope of the claims which follow.

What is claimed is:

1. In a motor vehicle, a frame having an engine driven propeller shaft supported thereon, a rigid wheel axle including a differential having a driving pinion universally connected to said propeller shaft, said axle extending transversely of and beneath said frame, a pair of laterally spaced longitudinally extending links pivotally connected at their opposite ends respectively to said frame and said axle, a generally V-shaped link disposed above and between said longitudinal links, said V-shaped link having its apex pivotally connected to said axle and its spaced apart portions pivotally connected to said frame on an axis parallel with but spaced from an imaginary axis passing through the pivotal connections between said longitudinal links and frame, and means for varying the longitudinal position of the pivotal connections of said spaced apart portions whereby to establish a predetermined angular relation between the axis of said pinion and the axis of said propeller shaft.

2. In a motor vehicle, a frame having an engine driven propeller shaft supported thereon, a rigid wheel axle including a differential having a driving pinion universally connected to said propeller shaft, said axle extending transversely of and beneath said frame, a pair of laterally spaced longitudinally extending links pivotally connected at their opposite ends respectively to said frame and said axle, a generally V-shaped link disposed between said longitudinal links, said V-shaped link having its apex pivotally connected to said axle and its spaced apart portions pivotally connected to said frame on an axis parallel with but spaced from an imaginary axis passing through the pivotal connections between said longitudinal links and frame, and means associated with the pivotal connections of each of said spaced apart portions adapted to vary the position of the said first mentioned axis whereby to establish optimum parallelism with said second mentioned axis and effect a predetermined angular relation between the axis of said pinion and the axis of said propeller shaft minimizing load vibration and noise transmission.

3. The structure set forth in claim 1 wherein said means for varying the position of the pivotal connections of said spaced apart portions comprises abutting brackets adapted to receive a plurality of shims therebetween, and means for connecting said brackets and shims in clamped engagement.

4. The structure set forth in claim 1 wherein said means for varying the position of the pivotal connections of said spaced apart portions comprises paired brackets having vertical transverse abutting faces adapted to receive a plurality of shims therebetween, and means for connecting said brackets and shims in clamped engagement.

References Cited in the file of this patent

UNITED STATES PATENTS

| | | |
|---|---|---|
| 1,323,935 | Wallace | Dec. 2, 1919 |
| 2,300,844 | Olley | Nov. 3, 1942 |
| 2,319,606 | Krautheim | May 18, 1943 |